(12) United States Patent  (10) Patent No.: US 9,070,944 B2
Yang et al.  (45) Date of Patent: Jun. 30, 2015

(54) PARTICLE SYNTHESIS APPARATUS AND METHODS

(75) Inventors: Lu Yang, Fremont, CA (US); Josef T. Hoog, El Granada, CA (US); Miaojun Wang, San Jose, CA (US); Dongli Zeng, Sunnyvale, CA (US); Robert Z. Bachrach, Burlingame, CA (US); Hooman Bolandi, San Jose, CA (US); Sergey D. Lopatin, Morgan Hill, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 282 days.

(21) Appl. No.: 13/572,047

(22) Filed: Aug. 10, 2012

(65) Prior Publication Data

US 2013/0214200 A1  Aug. 22, 2013

Related U.S. Application Data (60) Provisional application No. 61/522,920, filed on Aug. 12, 2011.

(51) Int. Cl.
*B01J 8/00* (2006.01)
*B01J 19/24* (2006.01)
(Continued)

(52) U.S. Cl.
CPC ............ *H01M 4/525* (2013.01); *B01J 19/2415* (2013.01); *B01J 19/0013* (2013.01); *B01J 2208/0053* (2013.01); *B01J 2219/00159* (2013.01); *B22F 9/16* (2013.01); *C01G 45/1235* (2013.01); *B22F 9/30* (2013.01); *C01G 51/42* (2013.01); *Y02E 60/122* (2013.01); *H01M 4/366* (2013.01); *H01M 4/505* (2013.01); *C01G 53/42* (2013.01); *C01G 53/50* (2013.01); *C01P 2002/72* (2013.01); *B01J 8/067* (2013.01); *B01J 8/087* (2013.01); *B01J 19/0006* (2013.01); *B01J 19/242* (2013.01); *B01J 4/002* (2013.01); *B01J 8/001* (2013.01); *B01J 8/004* (2013.01); *B01J 2208/00044* (2013.01); *B01J 2208/0007* (2013.01); *B01J 2208/00212* (2013.01); *B01J 2208/00415* (2013.01); *B01J 2219/00094* (2013.01); *B01J 2219/00135* (2013.01); *B01J 2219/00186* (2013.01); *B01J 2219/00198* (2013.01); *B01J 2219/002* (2013.01);
(Continued)

(58) Field of Classification Search
None
See application file for complete search history.

(56) References Cited

U.S. PATENT DOCUMENTS 4,749,557 A * 6/1988 Yetter et al. ................. 423/447.3
4,994,107 A * 2/1991 Flagan et al. ................... 75/367
(Continued)

OTHER PUBLICATIONS

Taniguchi et al. Solid State Ionics 146 (2002) 239-247.*
(Continued)

*Primary Examiner* — Jennifer A Leung
(74) *Attorney, Agent, or Firm* — Patterson & Sheridan, LLP (57) ABSTRACT

Apparatus and methods of forming a battery-active material are described. An apparatus includes a first processing section that raises the temperature of a precursor material to a reaction threshold temperature, a second processing section that converts the precursor material to a battery-active material, and a third processing section that cools the resulting battery-active material. Each of the processing sections may be a continuous flow tubular component. The first and third processing sections may be metal, and the second processing section may be a refractory material for high temperature service. The battery-active material is collected using a solids collector.

17 Claims, 7 Drawing Sheets (51) Int. Cl.
*B22F 9/16* (2006.01)
*B22F 9/30* (2006.01)
*H01M 4/525* (2010.01)
*B01J 19/00* (2006.01)
*C01G 45/12* (2006.01)
*C01G 51/00* (2006.01)
*H01M 4/505* (2010.01)
*C01G 53/00* (2006.01)
*B01J 8/06* (2006.01)
*B01J 8/08* (2006.01)
*B01J 4/00* (2006.01)
*H01M 4/36* (2006.01)

(52) U.S. Cl.
CPC .................. *B01J2219/00202* (2013.01); *B01J 2219/00211* (2013.01); *B01J 2219/00238* (2013.01)

(56) References Cited

U.S. PATENT DOCUMENTS 5,429,657 A * 7/1995 Glicksman et al. ............. 75/351
2011/0059316 A1 3/2011 Kilambi et al.

OTHER PUBLICATIONS

Taniguchi et al. Journal of Power Sources 109 (2002) 333-339.*
Deng, et al., "Compact multiplexing of monodisperse electrosprays," Aerosol Science 40, 2009, pp. 907-918.

* cited by examiner

PARTICLE SYNTHESIS APPARATUS AND METHODS

CROSS-REFERENCE TO RELATED APPLICATIONS

This application claims benefit of U.S. Provisional Patent Application Ser. No. 61/522,920 filed Aug. 12, 2011, which is incorporated herein by reference.

FIELD

Embodiments of the present invention relate generally to high energy batteries, and more specifically, to methods and apparatus for fabricating such batteries.

BACKGROUND

Fast-charging, high-capacity energy storage devices, such as supercapacitors and lithium (Li) ion batteries, are used in a growing number of applications, including portable electronics, medical devices, transportation, grid-connected large energy storage, renewable energy storage, and uninterruptible power supplies (UPS). In modern rechargeable energy storage devices, the current collector is made of an electric conductor. Examples of materials for the positive current collector (the cathode) include aluminum, stainless steel, and nickel. Examples of materials for the negative current collector (the anode) include copper (Cu) and nickel (Ni). Such collectors can be in the form of a foil, a film, or a thin plate, having a thickness that generally ranges from about 6 to about 50 μm.

The active electrode material in the positive electrode of a Li-ion battery is typically selected from lithium transition metal oxides, such as $LiMn_2O_4$, $LiCoO_2$, $LiNiO_2$, or combinations of Ni, Li, Mn, and Co oxides, and includes electroconductive particles, such as carbon or graphite, and binder material. Such positive electrode material is considered to be a lithium-intercalation compound, in which the quantity of conductive material is typically in the range from 0.1% to 15% by weight.

Graphite is usually used as the active electrode material of the negative electrode and can be in the form of a lithium-intercalation meso-carbon micro beads (MCMB) powder made up of MCMBs having a diameter of approximately 10 μm. The lithium-intercalation MCMB powder is dispersed in a polymeric binder matrix. The polymers for the binder matrix are made of thermoplastic polymers including polymers with rubber elasticity. The polymeric binder serves to bind together the MCMB powders to manage crack formation and disintegration of the MCMB powder on the surface of the current collector. The quantity of polymeric binder is typically in the range of 0.5% to 30% by weight.

The separator of Li-ion batteries is typically made from microporous polyolefin polymer, such as polyethylene foam, and is applied in a separate manufacturing step.

As Li-ion batteries become more important for power applications, cost-effective, high-volume manufacturing methods are needed. The electrodes of Li-ion batteries are commonly made using a sol gel process in which a paste of battery active material is applied to a substrate as a thin film and then dried to produce a final component. CVD and PVD processes are also conventionally used to form battery active layers for thin film batteries. Such processes have limited throughput, however, and are not cost-effective for high volume manufacturing. Such processes may also form materials with wide particle size distribution, particle shape, and variable electrode density. Energy batteries typically have high electrode density to be able to store a lot of energy, while power batteries typically have lower electrode density to be able to load and unload energy from the battery quickly.

Accordingly, there is a need in the art for cost-effective, high volume methods for making batteries with controllable energy and power density, and new materials suitable for such methods.

SUMMARY

Apparatus and methods for forming battery-active materials are described. An apparatus for forming a battery active material has a source of battery active precursor coupled to a linear drier that has a first plurality of independently controlled heating zones, a linear converter coupled to the linear drier, the linear converter having a second plurality of independently controlled heating zones, and a particle collector coupled to the linear converter. The linear drier and the linear converter may be surrounded by independently controlled heating elements. The source of battery active precursor may be coupled to the linear drier by a droplet generator.

Methods of forming battery-active materials include forming a precursor mixture having metal ions dispersed in a polar solvent, flowing the precursor mixture through a plurality of heating zones that dry the precursor mixture to form an intermediate material containing the metal ions, flowing the intermediate material through a plurality of reaction zones that convert the metal ions to battery-active nano- and/or microparticles in an exhaust gas stream, flowing the battery-active particles in the exhaust gas stream through a cooler, adding dry gas to the exhaust gas stream to control humidity, and collecting the battery-active particles. The particles may be annealed and/or coated before or after cooling. The plurality of heating zones increase the temperature of the precursor mixture steadily as the mixture progresses from one heating zone to the next, reaching a reaction temperature near the first of the plurality of reaction zones. Metal ions in the precursor react with oxygen or oxygen-containing anions in the reaction zones to form the battery-active material.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figures 1A, 1B, 1C:
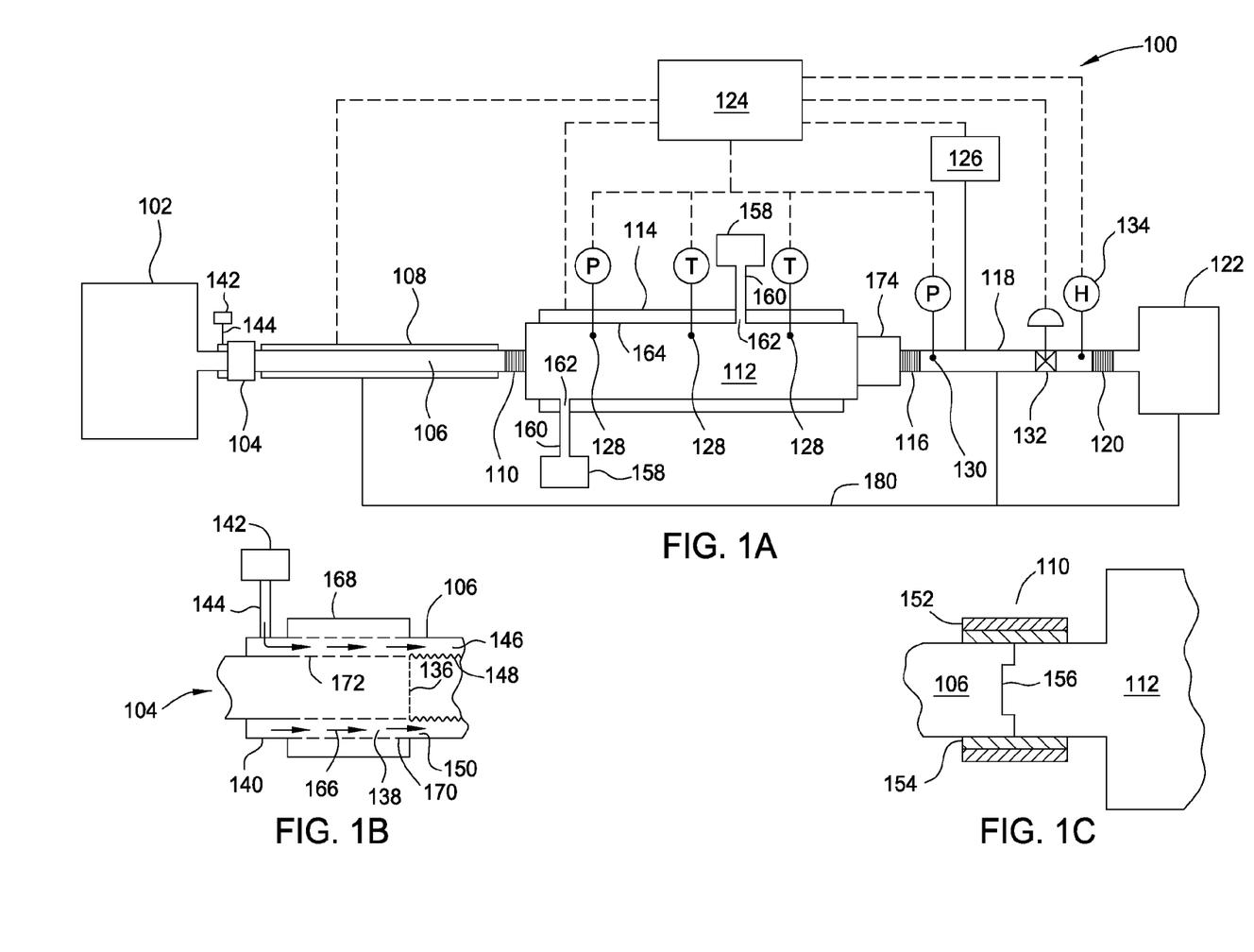
FIG. 1A is a schematic side view of an apparatus according to one embodiment.
FIG. 1B is a detail view of a coupling that may be used with the apparatus of FIG. 1A.
FIG. 1C is a detail view of another coupling that may be used with the apparatus of FIG. 1A.

FIG. 1A is a schematic side view of an apparatus 100 according to one embodiment. The apparatus 100 is a reaction system for forming battery-active materials from a precursor. The apparatus 100 may be a combustion synthesis apparatus or a spray synthesis apparatus, and may also be used to form solid materials other than battery-active materials. A precursor source 102 is coupled to a first processing section 106 by a dispersion member 104. The first processing section 106 is coupled to a second processing section 112 by a first coupling 110. The second processing section 112 is coupled to a third processing section 118 by a second coupling 116. The third processing section 118 is coupled to a collector 122 by a third coupling 120. The processing sections 106, 112, and 118 form a linear reactor that converts precursor materials to a battery-active powder that is collected by the collector 122.

The precursor source 102 generally has metal ions dispersed in a fluid, usually but not always a liquid that may be a solvent, such as a polar or non-polar solvent. In one aspect, the metal ions are derived from metal salts, and they are dissolved in a polar solvent, such as water, alcohols, ketones, aldehydes, carboxylic acids, amines, and the like, or mixtures thereof. The precursor source 102 may be a container, such as a tank, bottle, or ampoule, holding the precursor mixture, or the precursor source 102 may be a plurality of such containers with components to be mixed. In one embodiment, a first container may hold a metal salt solution such as a solution of metal nitrates in water, while a second container holds a reaction aid, for example a nitrogen containing organic material such as urea, that may act as a fuel to provide energy to the reaction. Precursors are pumped from their containers to the dispersion member 104.

Precursors usable to make battery-active materials using the apparatus and methods described herein generally comprise metal ions, such as ions of lithium, nickel, cobalt, iron, manganese, vanadium, and magnesium. In one exemplary embodiment, lithium, nickel, manganese, cobalt, and iron are used. The metal ions are added as salts, with anions that may decompose under appropriate conditions to yield reactive species. Such anions include inorganic anions such as nitrate, nitrite, phosphate, phosphite, phosphonate, sulfate, sulfite, sulfonate, carbonate, bicarbonate, borate, and mixtures or combinations thereof. Organic ions, such as acetate, oxalate, citrate, tartrate, maleate, ethanoate, butanoate, acrylate, benzoate, and other similar anions, or mixtures or combinations thereof, may also be used instead of, or in combination with, inorganic anions.

The metal salts are generally blended with a liquid carrier, which may dissolve the metal salts into a solution, if the liquid carrier is a polar solvent. If the liquid carrier does not dissolve the metal salts, a suspension or dispersion of the metal salts in the liquid carrier may be prepared. Examples of polar solvents that may be used include, but are not limited to, water, alcohols, ketones, aldehydes, carboxylic acids, acid anhydrides, amines, amides, esters, ethers, or combinations thereof. In addition to water, a non-exhaustive list of exemplary solvents that may be used includes methanol, ethanol, isopropanol, ethylene glycol, propylene glycol, acetone, methyl ethyl ketone, formaldehyde, acetaldehyde, acetic acid, maleic acid, maleic anhydride, benzoic acid, ethyl acetate, vinyl acetate, dimethylformamide, and dimethylsulfoxide. Non-polar or non-dissolving liquids that may be used generally include hydrocarbon fluids such as benzene, toluene, and light paraffins, which may be used instead of, or in addition to, polar solvents in some cases.

Carbon containing components are advantageous in some embodiments because they add carbon to the battery-active material resulting from use of the apparatus and methods described herein. During the reaction that converts metal ions to battery-active materials, amorphous carbon particles may be formed, provided oxygen-reactive species are in excess. The amorphous carbon particles may agglomerate around particles of battery-active material and ultimately deposit with the battery-active particles, providing improved conductivity of the deposited medium, along with density and porosity advantages in some cases. The carbon containing compounds described above may function in this way. Additional carbon containing species that may be added, particularly to polar solvent systems, include sugars, polyvinyl alcohol, polyvinyl acetate, polyethylene glycol, polyethylene oxide, alcohol ethoxylates, and the like. Such compounds may also be useful as viscosity modifiers and/or surfactants. Other surfactants, such as fatty acid esters may be used.

Nitrogen containing compounds may be added to the precursor mixture to facilitate forming uniform nuclei from the droplets, so that solid spherical particles of battery-active material are obtained. Such compounds may also provide energy in some cases to facilitate the conversion of metal salts to battery-active products. Urea and glycine are examples of usable additives that promote small particle formation and add energy. Ammonia may also be used to facilitate uniform nucleation.

The precursor mixture is generally formed from standard solutions or dispersions of the metal ions in the liquid carrier. For an exemplary embodiment comprising lithium, nickel, manganese, and cobalt, standard molar solutions of lithium nitrate, nickel nitrate, manganese nitrate, and cobalt nitrate may be prepared and blended with fair precision to determine the metal composition of the resulting battery-active media. Blending the different metals to desired concentrations in the final product affects electrical properties of the resulting battery, such as voltage, current, power, recharge performance, longevity, stability, and the like. In one embodiment, a mixture of 3M solutions of the above salts is blended, with about 10% stoichiometric excess of lithium nitrate, to form a precursor solution. Urea may be added to a mass concentration between about 5% and about 20%. Other additives described above may be added as desired.

The dispersion member 104 produces a dispersion of droplets into the first processing section 106. The dispersion member 104 may be an atomizer, a nebulizer, or a monodispersion or semi-monodispersion droplet generator operable to produce small droplets having desired size and size distribution. A monodispersion droplet generator suitable for use with the apparatus 100 may generate droplets having diameter of about 500 µm or less, such as between about 1 µm and about 200 µm, for example about 150 µm or less. In some embodiments, the monodispersion droplet generator may generate droplets having diameter of about 50 µm or less, for example between about 1 µm and about 30 µm, such as about 15 µm or less, for example between about 2 µm and about 15 µm, for example about 10 µm or less. The diameter of droplets from a suitable monodispersion generator typically varies less than about 50% from an average value. With some examples of monodispersion generators, droplets of diameter 20.0 µm with standard deviation of 5% or less are achieved. The monodispersion droplet generator may be a piezoelectric droplet generator, a Rayleigh nozzle, a centrifugal aerosol generator, a vibrating orifice aerosol generator, an ultrasonic droplet generator, an electrostatic droplet generator, an electrospray device, a rotary atomizer, a droplet-on-demand generator, or a vibrating mesh atomizer. A semi-monodispersion droplet generator will generate droplets having size variation more than a monodispersion droplet generator but less than an atomizer or other non-precision dispersion member.

FIG. 1B is a detail view of an exemplary dispersion member 104 with a monodispersion droplet generator 136, shown in phantom, that may be used as the dispersion member 104 in FIG. 1A. The generator 136 forms droplets that emerge into the first processing section 106. For most monodispersion droplet generators, the jet of droplets formed has a characteristic divergence that depends on surface tension, pressure drop, viscous forces, and in some cases, electrostatic forces. The dispersion member 104 has an outer radius 168 and an inner radius 170 shown in phantom. The inner radius 170 and an outer radius 172 of the generator 136 cooperatively form an annular passage 138 with an annular opening 150 surrounding the generator 136. The annular passage 138 and annular opening 150 fluidly couple a gas source 142 into the first processing section 106

To prevent collision of droplets with the wall of the first processing section 106, a confinement gas may be applied through the annular passage 138 surrounding the generator 136, exiting through the annular opening 150 surrounding the generator 136. The gas source 142 is coupled to an annular distribution plenum 140 through a conduit 144, and the gas flows into an annular region 146 adjacent the walls of the first processing section 106, as shown by arrows 166. The confinement gas may be an inert gas, such as nitrogen gas or argon, a reducing gas, such as hydrogen, or a reactive gas such as oxygen or air, fuel, or a mixture thereof, for example a combustible mixture. Using a combustible mixture as the confinement gas may be advantageous in some cases because a combustible mixture may be helpful to achieve a target temperature in the second processing section 112. The confinement gas may also be a drying and/or heating gas, such as hot air or hot nitrogen, which may be recycled from a cooling process further downstream.

The confinement gas creates an exclusion zone 148 preventing droplets from approaching the walls of the first processing section 106. Droplets emerging from the generator 136 with a divergent trajectory toward the walls are curved into an axial trajectory by the confinement gas. To enhance the effect of the confinement gas, the exit pressure of the confinement gas may be higher than the exit pressure of the droplet field emerging from the generator 136. A slight overpressure of the confinement gas results in expansion of the confinement gas into the droplet field, intensifying the aligning effect of the confinement gas. In such an embodiment, the annular opening 150 is sized, and the pressure of the gas source 142 selected, to deliver the confinement gas to the annular region 146 at a velocity substantially similar to the axial velocity of the droplet field exiting the generator 136. This maximizes the probability of laminar flow in the first processing section 106, which in turn maximizes separation distance of the individual droplets in the droplet field. Maintaining separation of the individual droplets may be useful in some cases where uniform particle size distribution is desired.

Separation of the droplets emerging from the monodispersion droplet generator 136 may be aided, as described above, by imparting electrostatic charge to the droplets. Additionally, a separation gas, which may be the same as the confinement gas described above, may be provided through openings in the exit surface of the monodispersion droplet generator between the openings that extrude droplets. A separation gas flow of similar linear velocity as the droplet linear velocity may provide laminar flow into the first processing section 106 and maximize the axial trajectory of the droplets. Delivering the confinement gas at a slightly higher pressure than the separation gas defining the droplet field creates a radial, pressure balancing flow of gas toward the central axis of the first processing section 106 just outside the monodispersion droplet generator that counteracts any tendency of droplets to diverge toward the walls of the first processing section 106, reducing the likelihood droplets will deposit on the walls. The droplet field is compressed into a laminar axial flow localized around the central axis of the first processing section 106, surrounded by the annular region 146 substantially free of droplets.

Different flow regimes may be used for different processes. Laminar flow regimes, for example having Reynolds number less than about 2,000, may be preferred for embodiments wherein droplet separation is desired. For some embodiments, however, laminar flow may inhibit heat transfer. In such embodiments, semi-turbulent flow with Reynolds number of about 2,000 to about 4,000, or turbulent flow with Reynolds number above about 4,000, may be preferred.

A monodispersion droplet generator such as the embodiment shown in FIG. 1B may be used to generating small droplets having very uniform size. Generating small droplets having uniform size depends on the combined effects of viscosity and surface tension in a flow regime. For example, a piezoelectric monodispersion device operates effectively using a fluid having a viscosity of 10-15 cp and surface tension of 35 dyne/cm in one embodiment. At comparable conditions, the viscosity of water is 1 cp and the surface tension of water is 70 dyne/cm. To achieve a desired viscosity and/or surface tension, components may be blended into the precursor mixture to increase or decrease viscosity and/or surface tension as needed. For example, some of the components described above, such as the sugars and water-soluble polymers, may be used to increase the viscosity and surface tension of a water-based solution of metal salts, while adding carbon to the mixture.

Referring again to FIG. 1A, the first processing section 106 is a linear heater, which may be tubular, surrounded by a heating element 108 that contacts the outer wall of the first processing section 106. The first processing section 106 may have a ratio of length to diameter of at least 2, for example at least 5, and may be scaled to any reasonable size. The first processing section 106 may be a thermally conductive material, such as metal, for example stainless steel. The heating element 108 may be unitary, a single heating element, or may comprise a plurality of heating elements such as heat jackets or heat bands. The heating element 108 generally provides thermal energy to raise the temperature of the dispersed precursor mixture travelling through the first processing section 106. The heating element 108 may be a resistive wall heater or a steam jacket or hot air jacket. Thermal energy from the heating element 108 is conducted to the wall of the first processing section 106 by contact, and is radiated and conducted from the wall into the precursor mixture. In one embodiment, the first processing section 106 is a stainless steel tube about 1.5 m long and 10 cm in diameter jacketed with four resistive heat bands. Alternately, the heating element 108 may be a pipe inside the first processing section 106 that carries a hot fluid, for example a heat exchanger.

In some embodiments, the first processing section 106 is a drier that evaporates some or all of the liquid from the droplets, increasing the temperature of the droplets and resulting particles that emerge, from near ambient at the entrance end of the first processing section 106 to near a reaction temperature of 500° C. or less at the exit end of the first processing section 106. The material exiting the first processing section 106 is an intermediate material. The intermediate material passes out of the first processing section 106 near a reaction temperature that is the temperature at which components of the droplets, particles, and/or gases begin to decompose and react. Depending on the composition of the intermediate material, the reaction temperature is typically less than about 500° C., for example less than about 400° C. The first processing section 106 may increase the temperature of the material substantially linearly as it transforms from a precursor material to the intermediate material.

The first processing section 106 couples to a second processing section 112 by a first coupling 110. The second processing section 112 may be a linear reactor or a converter, and may be tubular. The second processing section 112 typically has a ratio of length to diameter of at least 2, and may be between about 2 and about 50, for example about 25. In one embodiment, the second processing section 112 is about 2.5 m long and has a diameter of about 10 cm. In another embodiment, the second processing section 112 is 25 m long with a diameter of 1 m.

The second processing section 112 is typically made from a material that withstands high temperature, because the conversion reaction of metal ions into battery-active materials is performed at a reaction temperature as high as 2,000° C. in some cases, with typical maximum temperatures about 1,200° C. Materials such as ceramic (i.e. alumina), sapphire, refractory metal, and the like, are suitable for most embodiments of the second processing section 112. In one embodiment, the second processing section 112 is a ceramic cylindrical member that has a ratio of length to diameter of at least 2. Wall thickness of the second processing section 112 is typically selected to allow a heat content of the reaction mixture to be managed. In a ceramic tube embodiment, wall thickness may be about 5 mm.

The intermediate material that exits the first processing section 106 and enters the second processing section 112 may be a dry powder of particles entrained in a gas stream, a moist powder of particles entrained in a gas stream, a collection of liquid droplets and particles entrained in a gas stream, or a collection of liquid droplets entrained in a gas stream, depending on the degree of drying performed in the first processing section 106. The particles may be nano-sized particles or micro-sized particles, or a mixture thereof. The particles may be particles of metal salt precipitated from the liquid precursor material, particles of mixed metal ions and oxygen, representing partial conversion of metal ions to battery-active material, and particles fully converted to battery-active material comprising mainly metal ions and oxygen.

Oxygen or air is typically added to the reaction mixture when the reaction mixture enters the first processing section 106, but additional oxygen or air may be added directly to the second processing section 112, if desired, through openings 162 in the wall of the second processing section 112 coupled to a gas source 158 by a conduit 160. For materials such as $LiFePO_4$ that are sensitive to oxygen, inert gases such as nitrogen, or reducing gases such as hydrogen, or a mixture thereof, may be used as a carrying gas. Multiple gas sources may be coupled to the conduit 160 to deliver a variety of gases, if desired. Fuel such as hydrocarbon gas (e.g. propane, acetylene, or natural gas) may be added through the openings 162 to enhance the release of energy propelling the reaction. As noted earlier, an excess of oxygen-reactive species may allow amorphous carbon particles to form during the reaction. Cooling gases may also be injected, if desired, to control temperature, pressure, and residence time of particles in the second processing section 112.

Number and spacing of the openings 162 may be selected depending on the reaction being performed. For some processes, a high combustible content in the precursor mixture or the gas supplied to the inlet of the second processing section 112 may result in a peak temperature a short distance along the length of the second processing section 112. Cooling gases may be desired to control the peak temperature. The addition of fuels, cooling gases, and coating materials may be separated into different injection locations by including a plurality of injection ports. For some embodiments, accelerants may be added near the inlet of the second processing section 112, and cooling gases may be added near the exit of the second processing section 112 to manage the thermal profile of the third processing section 118, which may have a maximum temperature requirement.

Coating agents may also be injected, if desired, using the openings 162. In some embodiments, a coating agent may be used to provide a protective shell around the particles of battery-active material to avoid side reactions during charging and discharging. The coating is typically a strong material, such as ceramic, for example alumina, and may be formed by flowing an aluminum precursor compound as a gas into the second processing section 112, through the openings 162. Aluminum alkyls such as trimethyl aluminum, triethylaluminum, variants, derivatives, and mixtures thereof, are suitable coating agents. Such agents react with oxygen or oxygen-containing anions in the second processing section 112 to form a shell of aluminum oxide around the particles. Naturally, other materials such as aluminum nitrate, aluminum trifluoride, aluminum phosphate, and aluminum hydroxide may be applied as well.

Although the openings 162 are shown as single apertures in the wall of the second processing section 112, it should be noted that a plenum (not shown) may be provided around the wall to distribute the gas flow evenly around the circumference to maintain axial flow of the particles and droplets in the reaction mixture. The plenum may flow the gas at any angle with respect to the wall of the second processing section 112, depending on the desired flow profile. Alternately, a pipe may extend from the opening 162 to the center line of the second processing section 112 to release added gases with a flow trajectory along the central axis of the second processing section 112. The intermediate material reacts with oxygen as the temperature rises along the length of the second processing section 112. Oxygen and heat readily penetrate the emerging particles due to their small size, which improves the uniformity of the eventual particle of battery-active material that emerges from the second processing section 112.

Temperature in the second processing section 112 may be monitored using one or more temperature sensors 128 disposed in the wall of the second processing section 112. The temperature of the reaction may be controlled by adjusting quantities of reactive, energy-releasing components in the precursor mixture or by directly adding fuels and/or accelerants to the reaction mixture in the second processing section 112. Flows of fuels, for example, may be adjusted to maintain a desired temperature profile through the second processing section 112. Combustible mixtures may be added at one or more selected points along the length of the second processing section 112 to adjust the rate of temperature rise at desired points along the length.

Additional thermal control may be afforded along the second processing section 112 by heating elements 114 surrounding the second processing section 112 and in contact with the outer wall thereof. The heating elements may be resistive heat jackets or heat bands, or hot fluid heat jackets, for example steam jackets or hot oil jackets. The heating elements 114 typically comprise a plurality of independently controlled heating elements, but a single heating element may be provided in some embodiments. The heating elements 114 may be adjusted along with, or instead of, combustible injections to maintain a desired temperature profile. For exothermic reactions, the heating elements 114 may be provided to elevate the mixture to a reaction temperature to start the energy release, and to prevent large fluctuations in temperature along the second processing section 112. The heating elements 114 also reduce heat loss through the walls of the second processing section 112. For endothermic reactions, the heating elements 114 will provide energy. In one embodiment, three independently controllable resistive heat jackets are provided in surrounding contact with the outer wall of the second processing section 112. Any combination of the foregoing heating means, chemical, physical, and/or electrical, may be employed in any convenient combination.

Control may be manual or automatic, and may be open-loop or closed loop. In some embodiments, a fast temperature controller monitors the temperatures at various locations of the apparatus 100 and quickly adjusts heat input by the heating elements 114 and/or the heating elements 108, heat input by flows of fuels and/or accelerants to the second processing section 112, either from the precursor source 102 or the side streams through the openings 162, or cooling by input of cooling gases or carrier gases with the precursor at the inlet to the first processing section 106 or by the side streams through the openings 162. In some cases, a perturbation in density or heat content of droplets entering the second section may cause a momentary deviation in temperature at one temperature sensor. The fast controller may be configured to quickly adjust by adding heat in a way that compensates for the extra heat load of the droplets.

The second processing section 112 may have an inner surface 164 that is treated to minimize particles and/or liquid droplets collecting thereon. The inner surface 164 of the second processing section 112 may be coated with a lubricious material capable of withstanding the high temperatures prevalent in the second processing section 112, or the inner surface may be smoothed or roughened to a desired surface roughness. A highly polished and neat and chemical resistant metal such as titanium may coat the inner surface 164 in some embodiments. In other embodiments, a smooth crystalline material such as sapphire may be used to coat the inner surface 164 of a ceramic member. The coefficient of thermal expansion between the main body of the second processing section 112 and any coating on the inner surface 164 may be matched to any desired degree to reduce movement at the interface between the materials. Typically, an average surface roughness of $R_a < 200$ μm promotes uniform processing without substantial thermal variation, since temperatures that are too cool may result in insufficient conversion of particles.

As noted above, the reaction typically reaches a temperature between about 800 and about 1,500° C., such as between about 900° C. and about 1,200° C., for example about 1,000° C., near the exit end of the second processing section 112, where the flowing mixture comprises mainly particles of battery-active materials, exhaust gases, and inert gases. The hot mixture enters a third processing section 118, coupled to the second processing section 112 by a second coupling 116. The third processing section 118, which may be a linear member, cools the mixture. The third processing section 118 may be tubular, and may be formed from a thermally conductive material that withstands the high temperatures of the mixture emerging from the second processing section 112. Temperature resistant metals such as refractory metals tungsten, molybdenum, titanium, chromium, nickel, cobalt, and mixtures and alloys thereof may be used. Temperature resistant oxides such as alumina may also be used. Carbon may also be used as a refractory material, as tetrahedral or graphitic carbon, and may be combined with other refractory materials in a mixture or alloy. Other useful high-temperature metal alloys that may be used include, but are not limited to, qualifying varieties of Hastelloy, Kovar, Inconel, and Monel.

A cooling medium is applied to the outer surface of the third processing section 118 to remove heat conducted by the walls thereof. The cooling medium may be a gas flowed across the outer surface, or a cooling jacket may be applied with a cooling fluid. Alternately, the cooling medium may flow through one or more pipes disposed inside the third processing section 118 such that the hot gas and battery-active particles flow across the cooling pipes, and the cooling medium absorbs heat as it flows through the cooling pipes. In one aspect, the third processing section 118 may be used to pre-heat the precursor mixture before flowing into the first processing section 106 by flowing the precursor mixture at ambient temperature through a cooling jacket disposed around the third processing section 118. In this way, the apparatus 100 may be heat integrated. Alternately, any other cooling medium used in the third processing section 118 may be flowed to the heating element 108 of the first processing section, for example through heat integration line 180 to heat the precursor material.

A source of dry gas 126 may be fluidly coupled into the third processing section 118 to control humidity of the mixture as it cools. Water may be formed in the reaction or may remain from the precursor mixture. Condensing water may lead to agglomeration of the battery-active particles, so a dry gas may be added to control humidity and avoid approaching a dew point in the third processing section 118. A humidity sensor 134 may be provided to monitor humidity. Other gas sources may be similarly coupled to the third processing section 118 to supply coating agents to the third processing section 118, if desired.

A control valve 132 may be disposed in the third processing section 118 to control back pressure on the system. Controlling back pressure helps maintain flow characteristics through the various processing sections such that desired mass and energy transport properties are maintained. Pressure may be monitored at one or more points along the apparatus 100 using pressure sensors 130. Pressure may also be controlled by adjusting pressure of carrier gases flowing into the system at any location, such as at the inlet of the first processing section 106, or through any of the openings 162. Adjusting pressure in the system affects residence time of the droplets and particles, which in turn affects conversion of precursors to final products.

FIG. 1C is a detail view of a coupling embodiment that may be used for the couplings 110, 116, and 120. The coupling embodiment shown in FIG. 1C is for the first coupling 110. A joint 156 between two sections, in this embodiment between the first processing section 106 and the second processing section 112, is covered by the first coupling 110. The first coupling 110 has a sealing pad 154 and a clamp 152. The clamp 152 is usually metal, and may be any type of adjustable clamp. The sealing pad 154 may be different materials for the different couplings. For relatively low temperature service, such as the first coupling 110 and the third coupling 120, a compliant material such as rubber or plastic may be used as the sealing pad 154. For high temperature service, such as the second coupling 116, a temperature resistant material, such as a high temperature metal alloy or glass fiber, is used. The metal alloy may be selected to soften to a degree at operating temperatures to improve the sealing function of the high temperature sealing pad 154.

Referring again to FIG. 1A, the cooled battery-active particles are collected in a collector 122. The collector 122 may be any particle collector, such as a cyclone or other centrifugal collector, an electrostatic collector, or a filter-type collector. The cooled battery-active powder may be removed from the collector for transportation to a dispensing device for packaging or applying to a substrate. Alternately, the battery-active powder may be fed by gravity or screw feeder to a dispensing device directly from the collector. The dispensing device may be a sprayer in some embodiments, and may combine a binder material with the powder for secure application to a substrate.

An optional fourth processing section 174 may be included between the second processing section 112 and the third processing section 118 to anneal or calcine the battery-active particles. In some cases, annealing the battery-active particles may improve the electrical properties of the particles by completing conversion into the most useful chemical composition, removing any impurities remaining in the particles, and by removing defects from the crystal lattice of the particles. Annealing also promotes a uniform particle size and morphology distribution, which promotes packing density of the particles, and energy density of battery materials made from the particles.

The fourth processing section 174 may be a fluidized bed annealer in which a gas is flowed through the powder at a temperature between about 800° C. and about 1,200° C. Heat may be applied by wall heating or an internal heat exchanger or heat source, or the gas may be a hot gas. Alternately the fourth processing section may be a flow-through annealer in which the particles are subjected to a residence time at a temperature between about 800° C. and about 1,200° C. while flowing through the fourth processing section 174.

The apparatus 100 may be controlled using a controller 124, which may include a computer system. The controller 124 may take input data from the various sensors described above, and may adjust heating of the heating elements 108 and 114 of the first and second processing sections 106 and 112 to control the reaction. In some cases, relatively slow drying of the precursor material to form the intermediate material may be desired to form high tap density materials in the second processing section 112. Promoting uniform nucleation in the first processing section 106 at relatively low temperatures may also promote formation of solid spherical particles in the second processing section 112. Controlling temperature and residence time along the first and second processing sections 106 and 112 thus allows relatively fine control of particle size, composition, and morphology, which is usually beneficial for the final battery-active product.

The embodiments shown in FIG. 1A-1C feature a single train apparatus for producing particles, but other embodiments may have variations. For example, multiple such trains may be fed in parallel from a single precursor source system. Multiples of the second processing section 112 may be operated in parallel, fed by a single first processing section 106 or multiples thereof, and feeding one or more third processing sections 118.

Multiple collectors 122 may also be used to improve collection efficiency. For example, several cyclones may be operated in series to improve collection of very small particles. Additionally, exhaust gas from the collectors 122 may be remediated by combustion, scrubbing, filtering, catalytic conversion, or any combination thereof, to remove undesirable species of gases, such as nitrogen oxides, carbon monoxide, and even carbon dioxide if desired, and solids from the exhaust before it is released.

The system may be scaled to any reasonable size. The various processing sections 106, 112, and 118 are shown having different diameters in FIG. 1A, but they may be the same. Additionally, a second processing section 112 that is up to 100 cm (1 m) in diameter and up to 50 m long is envisioned. Additionally, the system may be oriented horizontally, vertically, or any orientation between horizontal and vertical.

Figure 2:
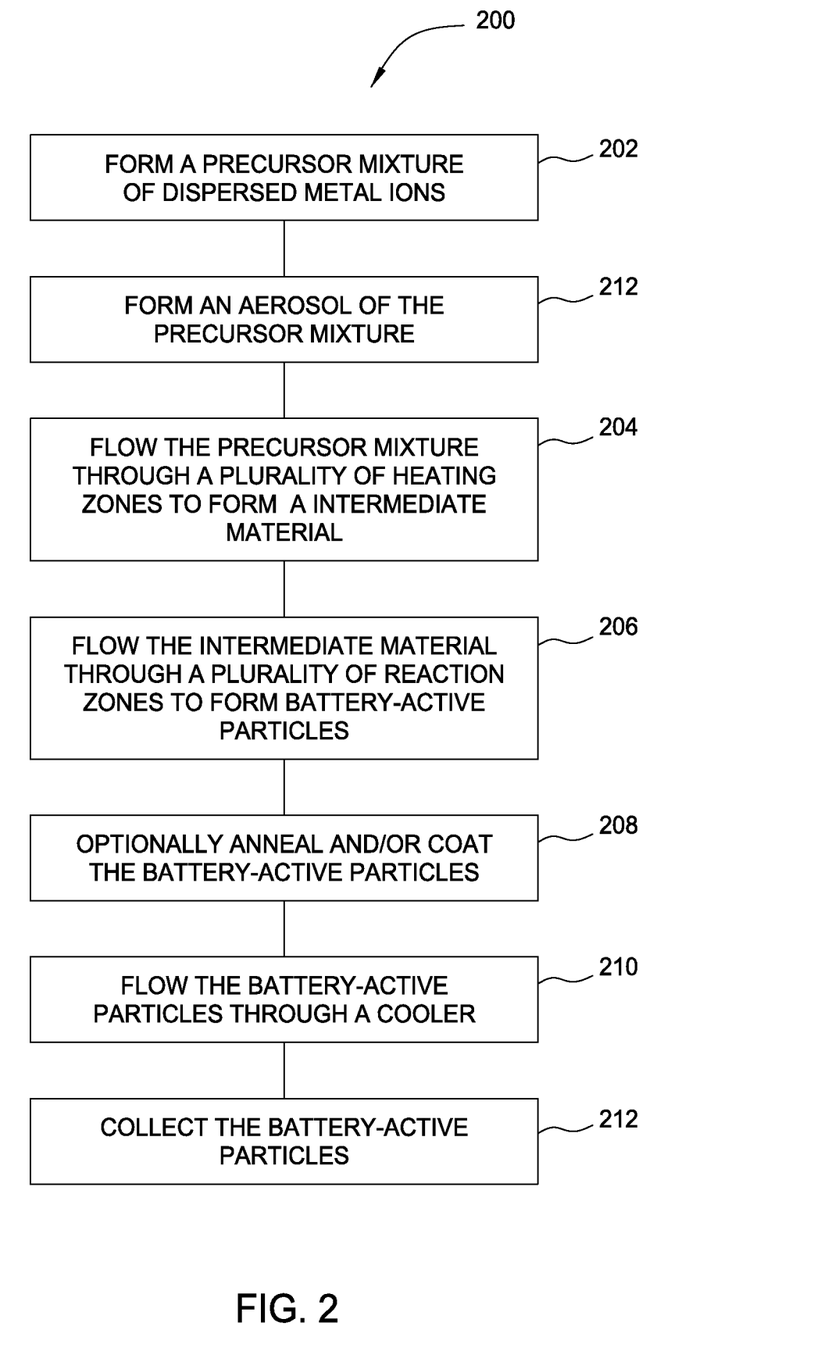
FIG. 2 is a flow diagram summarizing a method according to at least one embodiment.

FIG. 2 is a flow diagram summarizing a method 200 according to at least one embodiment. The method 200 is usable for forming battery-active materials, and may be practiced with embodiments of the apparatus 100 described above in connection with FIGS. 1A-1C.

At 202, a precursor mixture of dispersed metal ions is formed, as described earlier. Metal salts are dispersed or dissolved in a liquid carrier, typically in individual containers, and then blended in specific amounts, for example by flowing through mass flow meters to a mixer, to form the precursor mixture. Any of the additives described earlier may be added as well. Mixing may be by active mixing, such as stirring in a tank, by pumping with a mixing pump, or by static inline mixer.

At 212, the precursor mixture is dispersed into an aerosol of droplets. Dispersion may be by any of the dispersion members described above in connection with FIGS. 1A-1C above, with droplet sizes and size distributions given therewith. The dispersion member divides the precursor mixture into droplets that may be intimately contacted with other reactants and energy to form battery-active particles of uniform composition. For uniform droplet size, a monodispersion droplet generator as described earlier may be used. Droplets typically have diameter less than about 500 μm. In some embodiments, the monodispersion droplet generator generates droplets having diameter between about 100 μm and about 200 μm, for example about 150 μm. In other embodiments, the monodispersion droplet generator generates droplets having diameter between about 10 μm and about 100 μm, for example about 30 μm. In still other embodiments, the monodisperson droplet generator generates droplets having diameter between about 5 μm and about 15 μm, for example about 10 μm. Standard deviation of droplet size is generally less than about 50%, such as about 5%.

At 204, the precursor mixture is flowed through a plurality of heating zones to form an intermediate material. The heating zones evaporate liquid from the precursor mixture and nucleate particles from the precursor mixture to form an intermediate material. The intermediate material may be a dry powder, a moist powder, or a suspension of particles in liquid. The particles may be precipitated metal salts or may be partially converted to battery-active material by incorporating oxygen in addition to, or in place of, oxygen in the metal salts. In some cases, the metal salts may partially decompose in the heating zones to start the conversion reaction. The temperature of the material flowing through the heating zones is increased from an ambient temperature, or an elevated temperature if the material is used for cooling to promote heat integration, to a reaction threshold temperature that is typically less than about 500° C., such as between about 300° C. and about 450° C., for example between about 350° C. and about 400° C. The heating zones may be energized by independently controlled heat sources, if desired, for improved control of temperature profile.

At 206, the intermediate material is flowed through a plurality of reaction zones to form battery-active particles. The temperature of the intermediate material is increased from the reaction threshold temperature to a reaction temperature between about 800° C. and about 2,000° C., such as between about 900° C. and about 1,600° C., such as between about 1,000° C. and about 1,200° C., for example about 1,100° C. Anions of the metal salts decompose, releasing active oxygen species, nitrogen species, and the like. Oxygen in the gas phase may react with metal ions and carbon containing species, releasing energy that maintains the reaction. Heat may be added to the reaction zones using heating elements such as resistive jackets or hot air. Alternately or additionally, combustion of fuels such as urea, glycine, and/or hydrocarbons can be used to maintain the reaction temperature. Compounds such as urea, glycine, and ammonia, additionally coordinate with the metal ions to facilitate formation of the battery-active metal-oxygen matrix.

Oxygen is used to convert the intermediate material into a battery-active material. The oxygen may be added with the droplets of precursor mixture to aid in maintaining separation of the droplets, as described above in connection with FIG. 1B. The oxygen may be mixed with an inert gas, or with a reactive gas such as a hydrocarbon fuel. The reactive gas may provide extra energy to the reaction that converts the intermediate material to battery-active material, and may provide excess carbon to the mixture. A gas may also be flowed around a periphery of the droplets to prevent any droplets colliding with walls or process equipment.

Temperature of the reaction may be controlled by applying external heat sources such as resistive electrical heaters to the reaction zones, by adding increments of energy releasing compounds, such as fuels, to the reaction, or by adding cooling gases to the reaction mixture.

The particles are flowed into a cooler at 210. The cooler absorbs and radiates heat away. Cooling may be facilitated by conductive processes, such as applying cooling jackets or flowing cooling media, for example by blowing air or flowing a cooling fluid across the cooler. As described above, water may be present in the gas phase exiting the reaction zones, so humidity control may be desired during the cooling process to prevent agglomeration of the particles.

The particles may optionally be annealed or calcined by holding the particles at an intermediate temperature between about 800° C. and about 1,500° C., such as between about 900° C. and about 1,150° C., for example about 1,000° C., 1,050° C. or 1,100° C., for a residence time of 2 minutes to 120 minutes either before or after cooling. The annealing may be accomplished by flowing a hot gas through the particles in a fluidized bed device in one embodiment. The particles may also be coated with a ceramic coating, if desired, to improve performance.

The battery-active particles are collected at 212. The collection may be by any convenient means such as electrostatic or density means, for example by a centrifugal collector or cyclone. Alternately, the battery-active particles may be applied directly to a substrate by spraying, extruding, or spreading, blended with a binder material such as a rubber or other polymer in some cases. Particles made using the apparatus and methods described herein have morphology and size, and distribution of morphology and size, that may be tailored to improve compressed density in a battery electrode, which may provide improved energy density for the battery.

Materials that may be made according to the methods and apparatus described herein include metal oxides including lithium, other metals, and oxygen. Materials referred to as NMC materials typically have the elemental formula $Li_wNi_xMn_yCo_zO_2$, where w is a number from 1 to 1.5, such as between 1 and 1.2, and x, y, and z are each numbers between 0 and 1 that may be the same or different. The materials are made into a powder that include particles having a selected size distribution and morphology distribution, each of which may be broad or narrow as desired. A powder made of particles that are similar in size and substantially free of agglomeration may be made by annealing particles formed by the combustion synthesis reaction described above, and are described as single morphology powders. The particles typically have an average diameter less than about 50 μm, such as between about 0.1 μm and about 20 μm, for example about 5 μm. Such materials have advantages in battery applications because they may be packed more densely than other powders.

Figure 3:
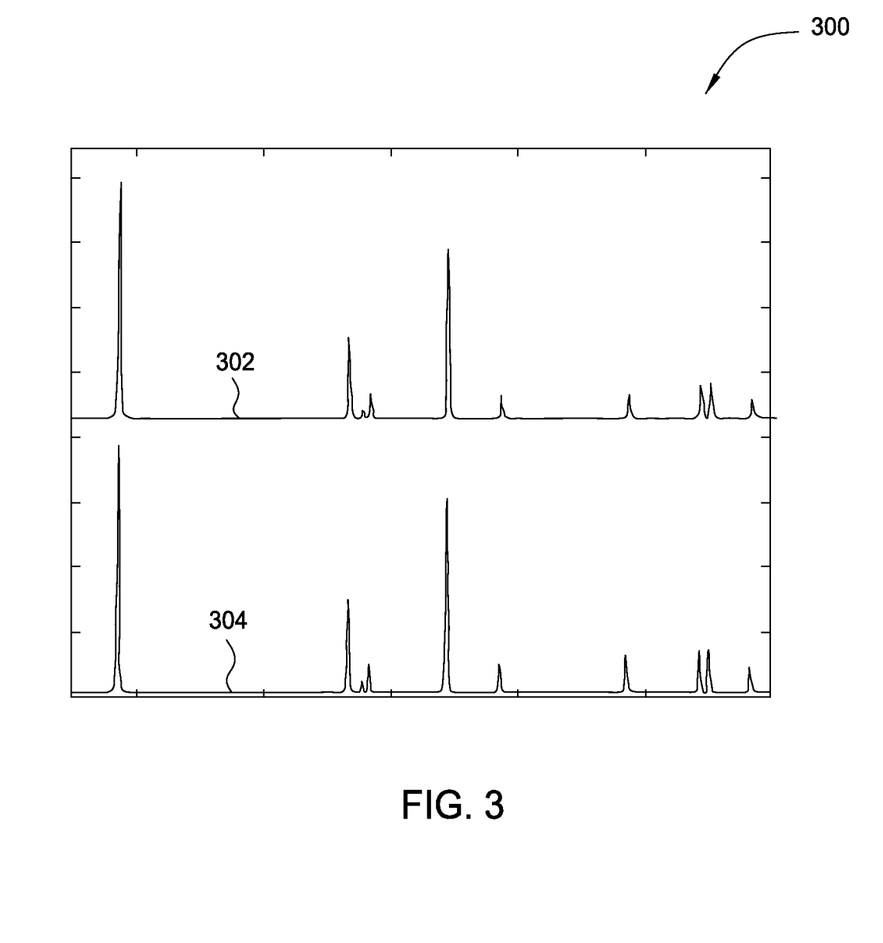
FIG. 3 is a graph showing x-ray diffraction data for a material made using the method of FIG. 2.

FIG. 3 is a graph 300 showing x-ray diffraction data for a material made according to a method as described in FIG. 2. The apparatus of FIGS. 1A-1C may be used to make such a material. The curve at 302 is data for a lithium-nickel-manganese-cobalt oxide material made by conventional processes, and the curve at 304 is data for an NMC333 material ($LiNi_{0.33}Mn_{0.33}Co_{0.33}O_2$) made according to the methods and apparatus described herein. NMC333 materials are also sometimes referred to as NMC111. The data of FIG. 3 indicate a similar crystal structure between the conventionally made NMC333 and the NMC333 made according to the processes and apparatus described herein.

Figure 4:
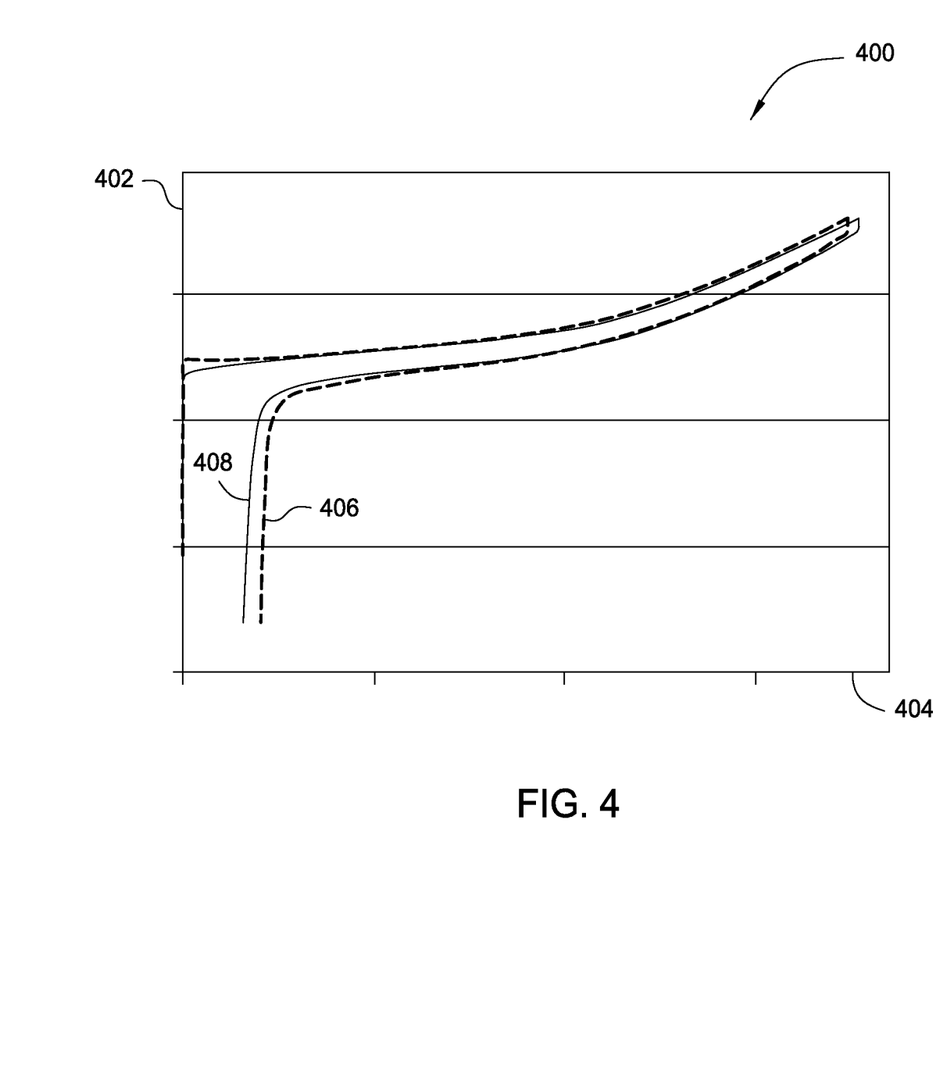
FIG. 4 is a graph showing first cycle charge/discharge profile for a material made according to the method of FIG. 2.

FIG. 4 is a graph 400 showing a first cycle charge/discharge profile for a material made according to the method of FIG. 2. The apparatus of FIGS. 1A-1C may be used to make such a material. The curve 406 represents the charging and discharging of a conventionally made NMC333 material, and the curve 408 represents the charging and discharging profile of an NMC333 material made according to the methods and apparatus described herein. The axis 402 is voltage and the axis 404 is specific capacity in mAh/g. The NMC333 material has a specific charge capacity of 177.6 mAh/g and a specific discharge capacity of 161.6 mAh/g for a cycle efficiency of 91.0%, while the conventionally made NMC333 has a specific charge capacity of 174.6 mAh/g and a specific discharge capacity of 154.3 mAh/g for a cycle efficiency of 88.4%. Thus, the NMC333 materials made according to the methods and apparatus described herein have higher specific charging and discharging capacity, and better cycle efficiency, that conventionally made NMC333 materials.

Figure 5:
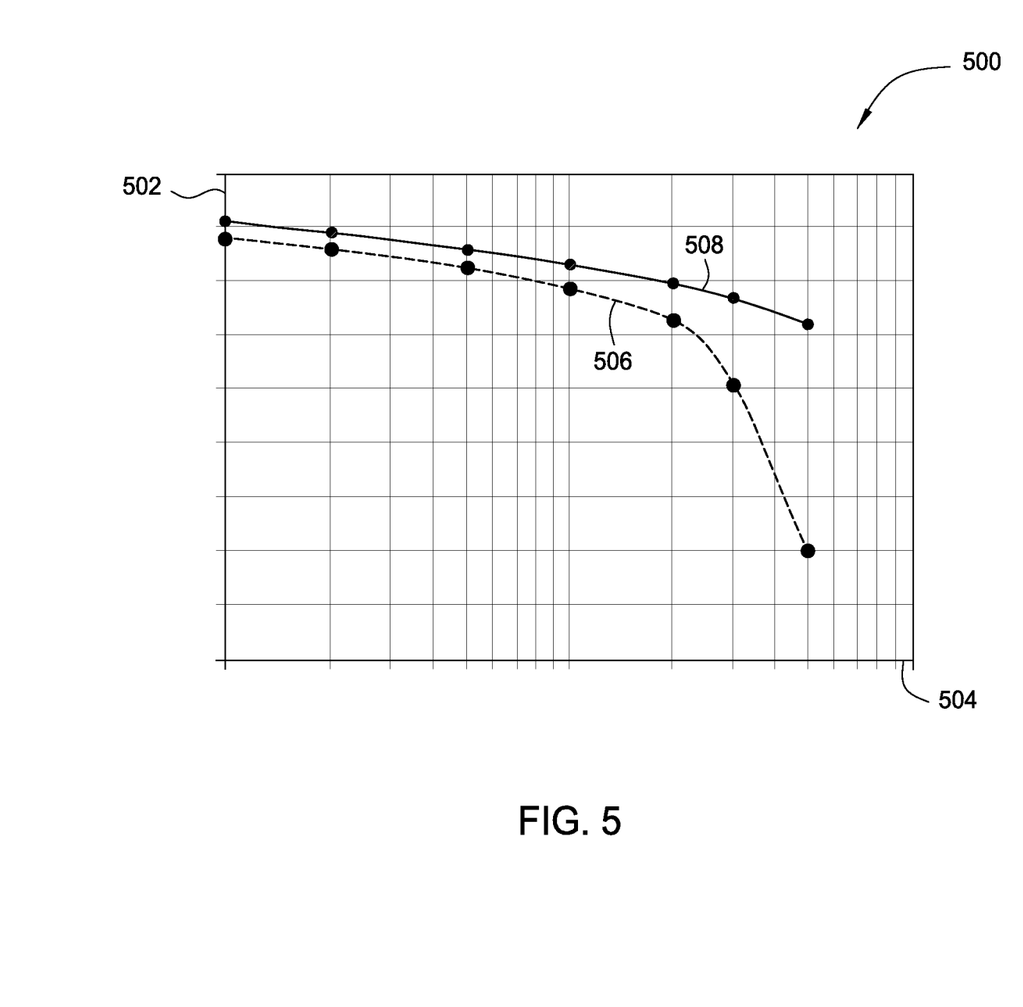
FIG. 5 is a graph showing specific capacity versus cycle rate for a material made according to the method of FIG. 2.

FIG. 5 is a graph 500 showing the power performance for a material made according to the method of FIG. 2. The apparatus of FIGS. 1A-1C may be used to make such a material. The curve 506 shows the decay in specific discharge capacity of a conventionally made NMC333 material as c-rate increases. The axis 502 is specific discharge capacity in mAh/g, and the axis 504 is c-rate on a logarithmic scale. The curve 508 shows the decay in specific discharge capacity of an NMC333 material made according to the methods and apparatus described herein. The NMC333 maintains a higher specific discharge capacity at all c-rates tested, and shows substantially better performance at higher c-rates, than the conventionally made NMC333 material.

Figure 6:
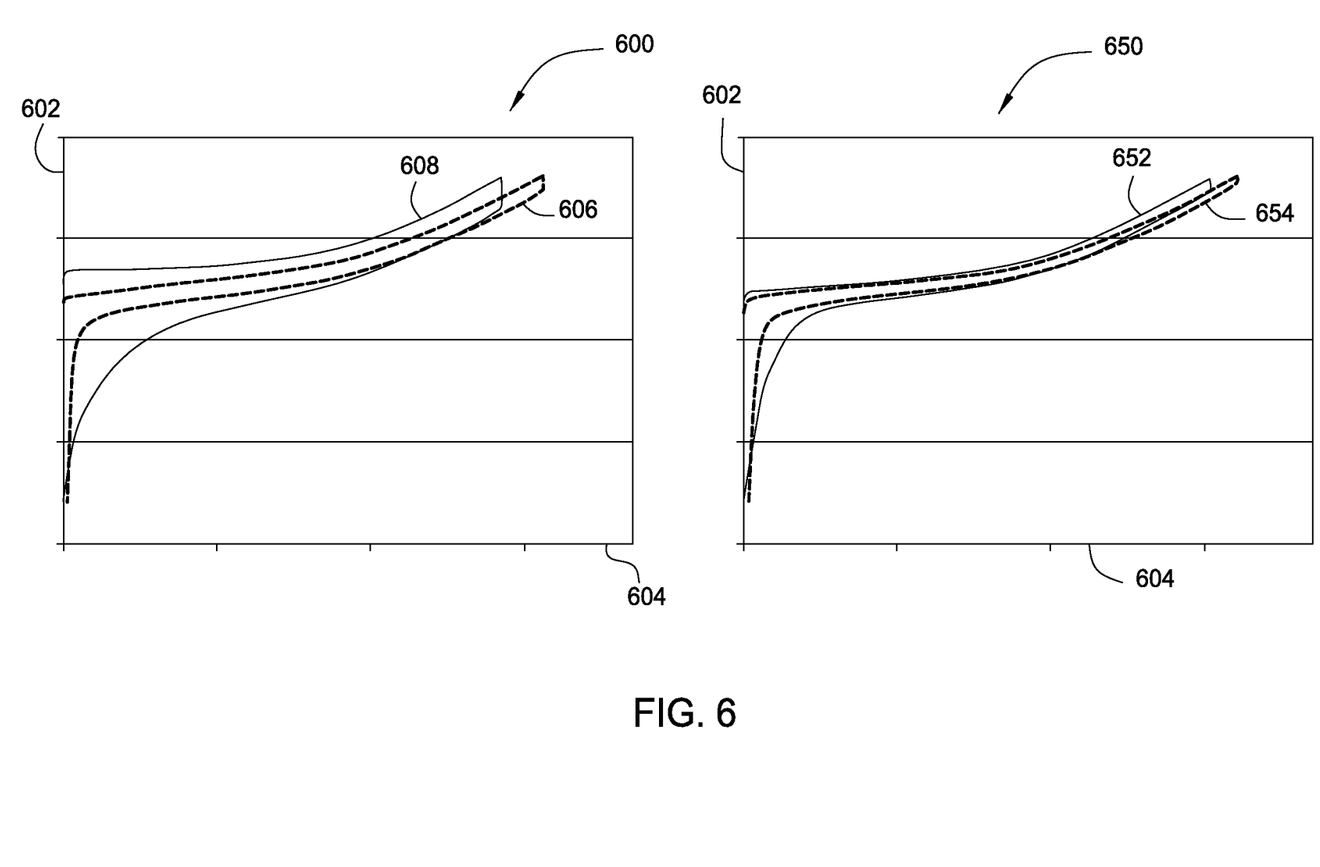
FIG. 6 is a graph showing energy efficiency of a material made according to the method of FIG. 2.

FIG. 6 is a comparative graph showing the comparative performance of a conventionally made NMC333 material on graph 600 and an NMC333 material made according to the methods and apparatus described herein on graph 650. The axis 602 is voltage and the axis 604 is specific capacity in mAh/g for each graph. The area enclosed by each charging/discharging curve represents the energy lost during a charge/discharge cycle. The curve 608 on graph 600 shows a charge/discharge profile for a conventionally made NMC333 material after 50 cycles. The comparable curve on graph 650, curve 652, shows a charge/discharge cycle for the NMC333 material after 50 charging cycles. Comparing the two curves shows that the NMC333 material loses less energy during the charge/discharge cycle than does the conventionally made NMC333 material. The curve 606 on graph 600 shows the charge/discharge profile of the conventionally made NMC333 material at cycle 2. Comparable curve 654 for the NMC333 material again shows less energy lost during the cycle. The graphs 600 and 650 of FIG. 6 demonstrate that an NMC333 material made according to the methods and apparatus described herein have better energy efficiency than conventionally made NMC333 materials.

Figure 7A:
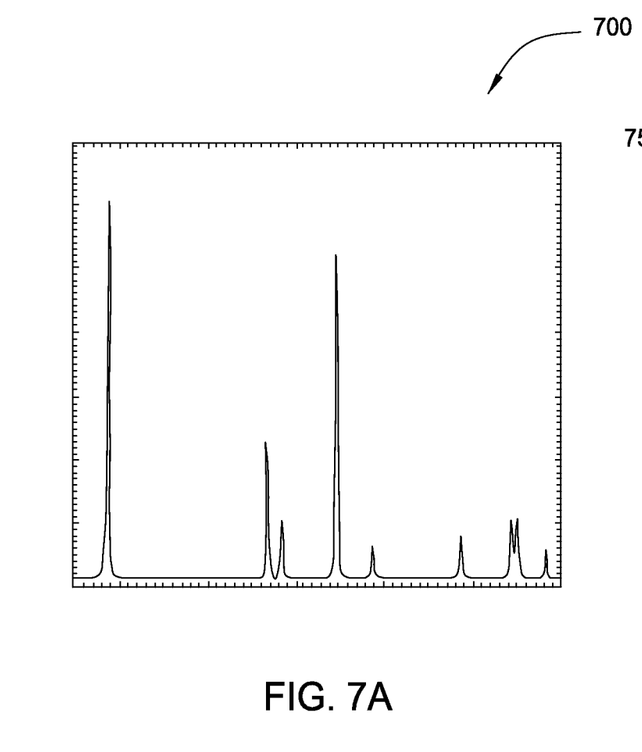
FIG. 7A is a graph showing x-ray diffraction data for another material made according to the method of FIG. 2.
Figure 7B:
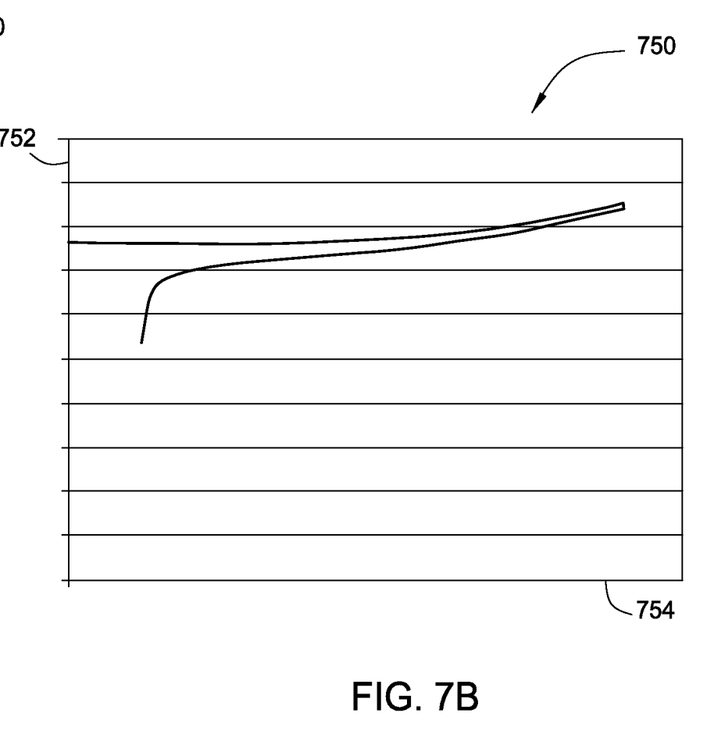
FIG. 7B is a graph showing first cycle charge/discharge profile for the material of FIG. 7A.

FIG. 7A is a graph 700 showing x-ray diffraction data for an NCA material ($LiNi_{0.8}Co_{0.15}Al_{0.05}O_2$) made according to the methods and apparatus described herein. FIG. 7B is a graph 750 showing a charge/discharge profile for the material of FIG. 7A. Axis 752 is voltage and axis 754 is specific capacity in mAh/g. Crystallinity and charging performance are characteristic. Charge capacity of the NCA material in graph 750 is 199 mAh/g and discharge capacity is 173 mAh/g, for a coulombic efficiency of 87%.

In addition to the NMC333 material above, other materials that have been made by the inventors using the methods and apparatus described herein include $xLiMnO_3.(1-x)$NMC333, NCA, NMC442, NMC532, NMC992, NMC550 (cobalt free), and $LiNi_{0.5}Mn_{1.5}O_2$ (a high voltage spinel).

While the foregoing is directed to embodiments of the invention, other and further embodiments of the invention may be devised without departing from the basic scope thereof.

What is claimed is:

1. An apparatus for forming a battery active material, comprising:
    a precursor inlet;
    a linear heater coupled to the precursor inlet, the linear heater having a first plurality of independently controlled heating zones;
    a linear converter coupled to the linear heater, the linear converter having a second plurality of independently controlled heating zones;
    a particle collector coupled to the linear converter;
    an annealer coupled to the linear converter; and
    a heat recycle line coupled to the linear heater.

2. The apparatus of claim 1, wherein the linear converter is surrounded by heating elements.

3. The apparatus of claim 1, wherein the precursor inlet is coupled to the linear heater by a droplet generator.

4. The apparatus of claim 1, wherein the linear heater and the linear converter are surrounded by heating elements.

5. The apparatus of claim 2, further comprising a controller coupled to the heating elements.

6. The apparatus of claim 3, wherein the droplet generator is a monodispersion or semi-monodispersion droplet generator.

7. The apparatus of claim 4, wherein each of the heating elements is a resistive heat jacket.

8. The apparatus of claim 1, wherein the linear converter is a ceramic cylindrical member wherein a ratio of a length of the cylindrical member to a diameter of the cylindrical member is at least 2.

9. The apparatus of claim 3, wherein the droplet generator is a piezoelectric droplet generator.

10. The apparatus of claim 3, further comprising a source of battery active precursor coupled to the droplet generator.

11. The apparatus of claim 1, wherein the linear converter is a continuous-flow tubular reactor having a ratio of length to diameter of at least 2.

12. A combustion synthesis apparatus, comprising:
    a droplet generator;
    a linear heater coupled to the droplet generator; and
    a linear reactor coupled to the linear heater, the linear reactor having a plurality of heating elements disposed around the linear reactor;
    a linear cooler coupled to the linear reactor; and
    a heat recycle line from the linear cooler to the linear heater.

13. The combustion synthesis apparatus of claim 12, further comprising a source of liquid precursor coupled to the droplet generator, wherein the droplet generator is a monodispersion or semi-monodispersion droplet generator.

14. The combustion synthesis apparatus of claim 12, further comprising a controller coupled independently to each of the heating elements.

15. The combustion synthesis apparatus of claim 12, wherein the droplet generator is a piezoelectric droplet generator.

16. The combustion synthesis apparatus of claim 12, further comprising a source of cooling gas coupled to the linear cooler.

17. The combustion synthesis apparatus of claim 12, further comprising a humidity sensor coupled to the linear cooler.

* * * * *